United States Patent [19]
Neumann

[11] 3,858,438
[45] Jan. 7, 1975

[54] ULTRASONIC-GAGING SYSTEM METHOD AND APPARATUS

[75] Inventor: Leopold Neumann, Lexington, Mass.

[73] Assignee: Panametrics, Inc., Waltham, Mass.

[22] Filed: Nov. 13, 1972

[21] Appl. No.: 306,175

[52] U.S. Cl. .................................................. 73/67.9
[51] Int. Cl. ............................................ G01n 29/00
[58] Field of Search ........ 73/67.9; 324/189; 328/129

[56] References Cited
UNITED STATES PATENTS
3,354,700  11/1967  Schindler............................ 73/67.9
3,427,868   2/1969  Charbonnier et al................ 73/67.9

*Primary Examiner*—James J. Gill
*Attorney, Agent, or Firm*—Morse, Oles & Bello

[57] ABSTRACT

A method and apparatus for measuring a time interval. In particular an ultrasonic-gaging system for measuring the thickness of an object by generating an absolute analog signal defining the difference between a dummy measurement and a full measurement. During the dummy measurement, a digitally controlled current related to the material velocity coefficient of the object charges an integrator capacitor for a first time interval. Upon completion of the dummy measurement, the voltage stored on the integrator capacitor is applied to an offset capacitor through an amplifier. The offset capacitor is charged to a first voltage which represents the dummy measurement interval and system errors. During the full measurement, the integrator capacitor, which is discharged at the begining of the full measurement, is charged by the material velocity coefficient current for a second time interval related to the thickness of the object plus the interval of the dummy measurement, the second time interval greater than the first time interval. Upon completion of the full measurement, the voltage stored on the integrator capacitor is fed to a digital panel meter via the amplifier and offset capacitor. The signal at an output terminal of the amplifier represents the thickness of the object plus the interval of the dummy measurement and system errors. The absolute analog signal applied to the panel meter is the difference between the signals at the output terminal of the amplifier at the end of the dummy full measurements, the first voltage being stored on the offset capacitor.

10 Claims, 4 Drawing Figures

Patented Jan. 7, 1975

ULTRASONIC-GAGING SYSTEM METHOD AND APPARATUS

BACKGROUND OF THE INVENTION

1. Field of the Invention:

The present invention relates to measuring devices and, more particularly, is directed towards a method and apparatus for measuring the time interval between two pulses.

2. Description of the Prior Art:

Ultrasonic-gaging systems find application in the measurement of the thickness of an object which is capable of transmitting ultrasonic vibrations. Sound waves transmitted through the object at a characteristic velocity are reflected from acoustic boundaries. Generally, the basic elements of the ultrasonic-gaging system comprises a generator to produce high frequency electronic vibrations which, in turn, activate a crystal transducer. The transducer converts the electrical signals to mechanical vibrations which are applied to the object. Echo pulses from various boundaries in the object are sensed by the transducer. The sensed echo pulses are reversibly converted from mechanical vibrations to an electrical signal. The transit time of the pulses through the object is measured for determining the thickness of the object. Such ultrasonic-gaging systems have suffered from the disadvantages of limited application for objects having a wide range of thicknesses and of limited accuracy due to the inherent errors introduced by the system itself, the precision with which material velocity constants can be entered into the system and the difficulties associated with transit time measurements.

SUMMARY OF THE INVENTION

It is an object of the present invention to provide a method and apparatus for measuring a time interval, particularly an ultrasonic-gaging system for measuring the thickness of an object, which does not suffer from the heretofore mentioned disadvantages. The present invention comprises a pulser/receiver for generating driving pulses which are applied to an ultrasonic transducer and for receiving echo pulses which are picked up by the transducer. Upon completion of a two phase measurement cycle, a conversion unit controlled by a logic and timing unit generates an absolute analog signal which represents the difference between the first phase and second phase measurements. In the first phase measurement, a discharged integrator capacitor is charged for a first time interval by a digitally controlled current which is related to the material velocity coefficient of the object. After the first time interval, an amplifier controls the charging of an offset capacitor to a first voltage representing the charge on the integrator capacitor and amplifier offset. The first voltage includes system delay and other errors. In the second phase measurement, the integrator capacitor is discharged again and is charged by the current related to the material velocity coefficient of the object for a second time interval specified by the thickness of the object and the first time interval. After the second time interval, the signal at the output terminal of the amplifier, which includes the charge on the integrator capacitor and the amplifier offset which also includes system delay and other errors and the measurement of the first time interval, is fed to a digital panel meter via the offset capacitor. Since the magnitude of the voltage stored on the offset capacitor at the end of the first phase measurement included the amplifier offset and system delay and other errors and the measurement of the first time interval, the signal fed to the panel meter at the end of the second phase measurement is free of amplifier offset and system delay errors as well as the measurement of the first time interval. The absolute analog signal, which is a measure of the thickness of the object, is applied to the digital panel meter for presentation in digital form. The combination of pulser/receiver, ultrasonic transducer, conversion unit and logic and timing unit for generating an absolute analog signal representing the difference between the first and second phases of a measurement cycle is such as to provide an accurate and expeditious ultrasonic-gaging system.

The invention accordingly comprises the system possessing the construction, combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF INVENTION

Figure 1:
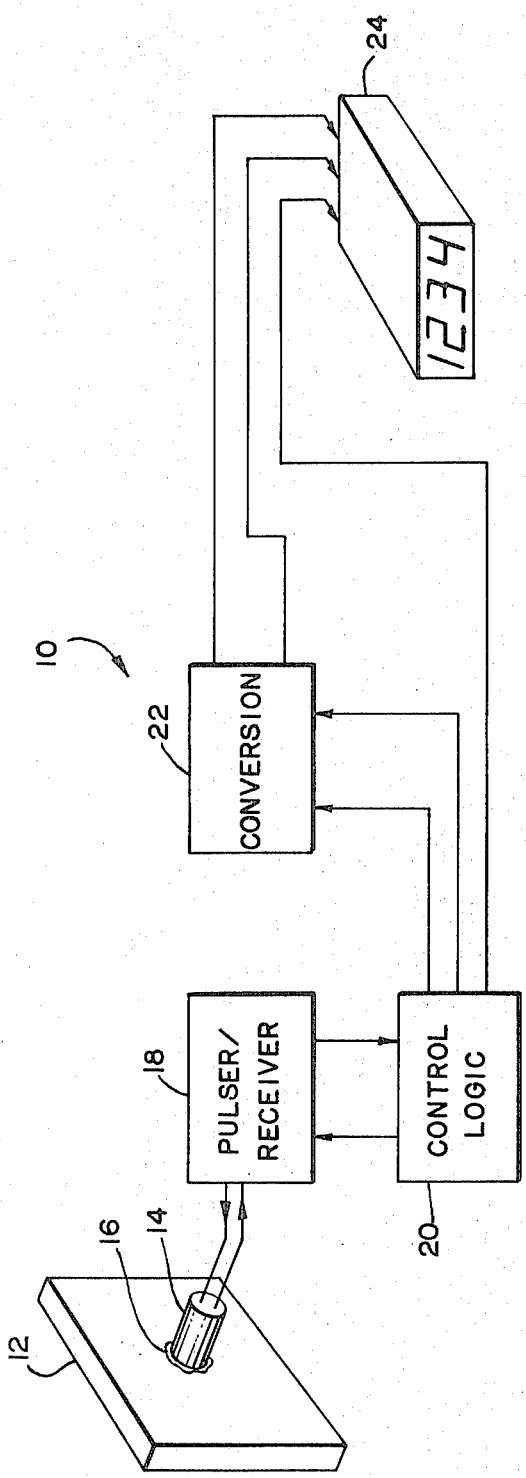
FIG. 1 is a block diagram, partly in perspective, of an ultrasonic-gaging system made in accordance with the present invention.

Referring now to the drawings, particularly, FIG. 1 there is shown an ultrasonic-gaging system 10 for measuring the thickness of a sound transmitting object 12, An ultrasonic transducer 14 is held against object 12 in order to permit coupling of mechanical vibrations of ultrasound generated by transducer 14 to object 12, a suitable coupling material 16, for example a couplant such as oil, grease, glycerine, water, and the like, is applied between the working end of transducer 14 and object 12. In the illustrated embodiment, by way of example, ultrasonic transducer 14 is a transmit/receive piezoelectric transducer which is triggered by a pulser/receiver 18. Echo pulses sensed by transducer 14 are fed to a control logic 20 via pulser/receiver 18. Logic signals generated by control logic 20 are applied to a conversion unit 22 for controlling a two phase measurement cycle. Conversion unit 22 generates an absolute analog signal which represents the difference between the first and second phase measurements. The absolute analog signal generated by conversion unit 22 is applied to a display 24, for example a digital panel meter, for presenting the thickness of object 12 in digital form.

Figure 2:
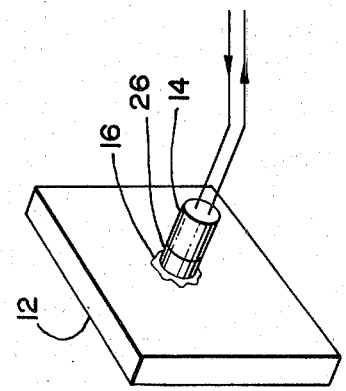
FIG. 2 is a perspective of a delay crystal used in connection with the system of FIG. 1.

For measuring material thicknesses in the approximate range of 20-0.01 inches, ultrasonic thickness-gaging system 10 has three modes of operation hereinafter referred to as mode 1, mode 2, and mode 3. In mode 1, for thick materials, the thickness is determined by measuring the time interval between an initial starting pulse and an echo pulse. In mode 2, for thin materials, the thickness is determined by measuring the time interval between two successive echo pulses. In mode 3, for very thin materials, the thickness is determined by measuring the time interval between two successive echo pulses using a delay crystal 26 interposed between transducer 14 and object 12, as shown in FIG. 2. The detailed circuitry of ultrasonic-gaging system 10 is shown in the detailed block and schematic diagram of FIG. 3.

Figure 3:
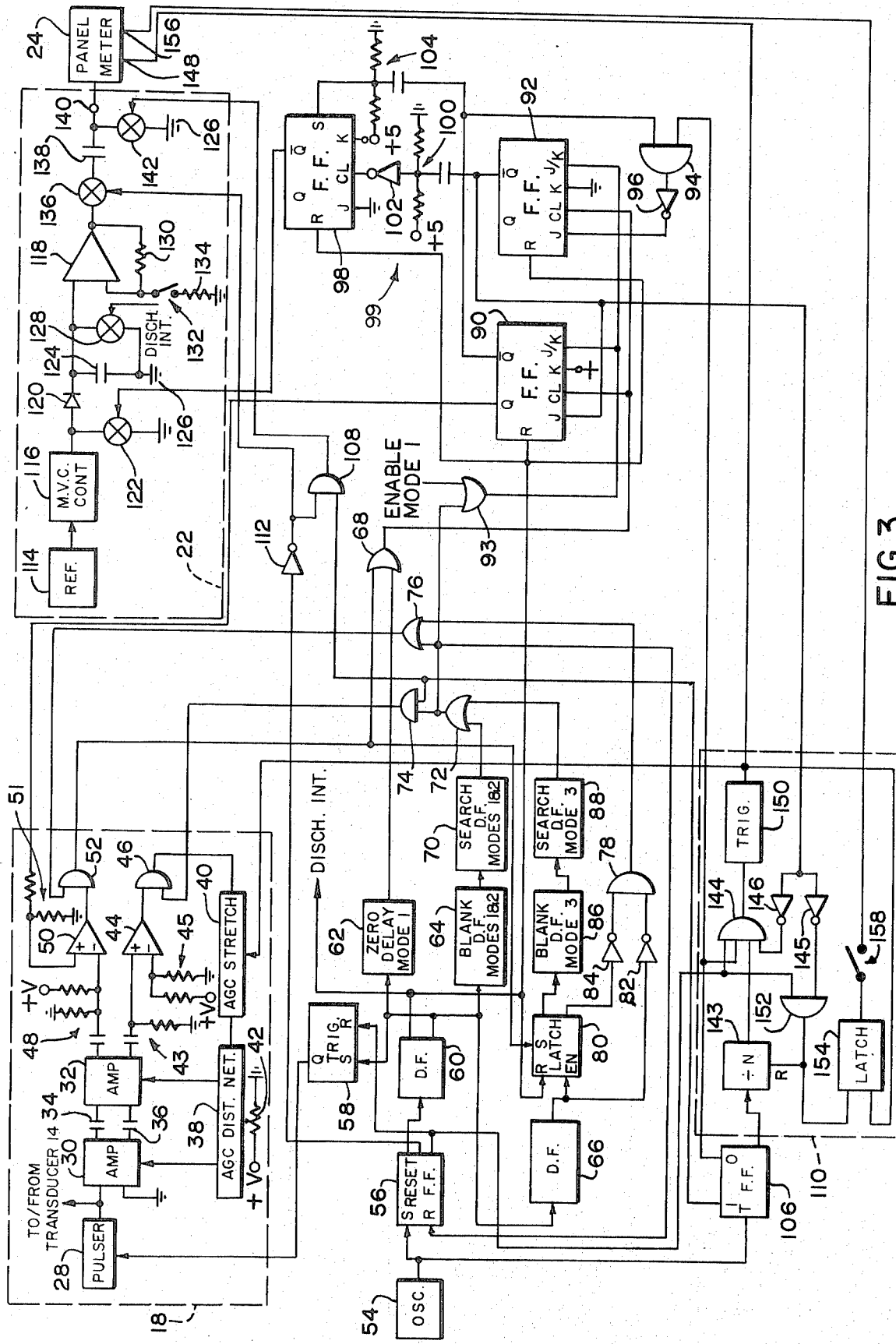
FIG. 3 is a detailed block and schematic diagram of the ultrasonic-gaging system of FIG. 1.

Referring now to FIG. 3, it will be seen that pulser/receiver 18 comprises a pulser 28 for generating driving pulses which are applied to transducer 14. Received echo pulses sensed by transducer 14 are applied to an amplifier 30 and are AC coupled to an amplifier 32 via capacitors 34 and 36. The gain of amplifiers 30 and 32 is controlled by an automatic gain control distribution network 38 which receives input signals from an automatic gain control stretcher 40 and a voltage divider network 42. In the illustrated embodiment, by way of example, amplifiers 30 and 32 are double-ended amplifiers. The signal at one input terminal of amplifier 32 is fed to the non-inverting input terminal of an amplifier 44 via a coupling network 43, the inverting input terminal of amplifier being connected to an automatic gain control level threshold network 45. The signal at the output terminal of amplifier 44 is applied to automatic gain control stretcher 40 via an AND gate 46. Echo pulses at the other output terminal of amplifier 32 are applied to the inverting input terminal of an amplifier 50 via a coupling network 48, the non-inverting input terminal of amplifier 50 being connected to control logic 20 via a threshold modify network 51. The signal at the output terminal of amplifier 50 is fed to control logic 20 via an AND gate 52.

Control logic 20 comprises an oscillator 54 for generating pulses which are applied to a resetable delay flop 56. A discharge integrator delay flop 60 is triggered by the leading edge of the gated signal generated by resetable delay flop 56. A zero delay flop 62, a blanking delay flop 64, a trigger pulser flip-flop 58 and an interface echo delay flop 66 are triggered by the trailing edge of a gating pulse generated by delay flop 60. The signal at the output of zero delay flop 62, which is enabled in mode 1 only, is applied to an OR gate 68 which also receives an echo pulse signal at the output terminal of AND gate 52. A search delay flop 70 is gated by the trailing edge of the signal generated by blanking delay flop 64 search delay flop 70 and blanking delay flop 64 being enabled in modes 1 and 2 only. The signal at the output of search delay flop 70 is applied to an input terminal of AND gate 46 via an OR gate 72 and an AND gate 74. The signal at the output of OR gate 72 is applied to an input terminal of an OR gate 76, the signal at the output of OR gate 76 being an enable echo pulse which is fed to AND gate 52. OR gate 76 also receives a look for interface echo interval signal generated by an AND gate 78 which is gated by signals at the output of delay flop 66 and an interface echo detect latch 80 via inverters 82 and 84, respectively. Interface echo detect latch 80 is reset by the signal at the output of discharge integrator delay flop 60 and is disabled by the signal at the output of delay flop 66. Interface echo detect latch 80 is set by the echo pulse signal at the output of AND gate 52. A blanking delay flop 86 is triggered by the leading edge of the gated pulse generated by interface echo detect latch 80. The trailing edge of a gated signal generated by blanking delay flop 86 triggers a search delay flop 88, blanking delay flop 86 and search delay flop 88 being enabled in mode 3 only. The gated signal generated by search delay flop 88 is applied to OR gate 72, the trailing edge of the signal at the output terminal of OR gate 72 being applied to the reset terminal of resetable delay flop 56. An interval flip-flop 90 and an echo gate flip-flop 92, for example JK flip-flops, receive the signal at the output of OR gate 68 at their clock input terminals. The J/K enable input terminals of interval flip-flop 90 and echo gate flip-flop 92 receive either the signal at the output of OR gate 72 or a mode 1 enable signal via an OR gate 93. The signal at the Q terminal of interval flip-flop 90 is applied to the J terminal of echo gate flip-flop 92 via an AND gate 94 and an inverter 96. The down going signal at the Q terminal of echo gate flip-flop 92 causes generation of a fixed interval echo pulse or artifice pulse via a pulse forming network 99 which includes differenciator 100 and inverter 102. The artifice pulse is applied to a clock input terminal of an integrator control flip-flop 98, for example a JK flip-flop. The down going signal at the $\overline{Q}$ terminal of interval flip-flop 90 is applied to the set terminal of integrator control flip-flop 98 via a differentiation coupling network 104. Interval flip-flop 90, echo gate flip-flop 92 and integrator control flip-flop 98 are reset by the signal at the output of delay flop 60. AND gate 94, which controls the signal applied to the J terminal of echo gate flip-flop 92, also receives a signal as at the zero terminal of a flip-flop 106 which is triggered by pulses generated by oscillator 54. A signal at the one terminal of flip-flop 106 is applied to AND gate 74 and an AND gate 108. The signal at the zero terminal of flip-flop 106 is applied also to a panel meter control unit 110. The signal generated by resetable delay flop 56 is applied to AND gate 108 via an inverter 112. The signals at the output terminals of inverter 112 and AND gate 108 and the signal at the $\overline{Q}$ terminal of integrator control flip-flop 98 are applied to conversion unit 22 for control thereof.

Conversion unit 22 comprises a reference source 114 for generating a reference voltage which is applied to a material velocity coefficient control 116. The signal at the output of material velocity coefficient control 116 is applied to an amplifier 118 via a diode 120. A shunt switch 122, which is controlled by the signal at the $\overline{Q}$ terminal of integrator control flip-flop 98, is connected between the output terminal of material velocity control 116 and diode 120. An integrator capacitor 124 is connected between a return 126 and the junction of diode 120 and amplifier 118. A switch 128 is connected in parallel with integrator capacitor 124, one side of integrator capacitor being connected to a non-inverting input terminal of amplifier 118 and the other side being connected to return 126. A switch 132 and a resistor 134 are serially connected between return 126 and the junction of the inverting input terminal of amplifier 118 and a feedback resistor 130. A series switch 136 and an offset capacitor 138 are serially connected between an output terminal of amplifier 118 and an output terminal 140 of conversion unit 22. Series switch 136 is controlled by the signal at the output terminal of inverter 112. A clamp switch 142, which is connected between terminal 140 and return 126, is controlled by the signal at the output terminal of AND gate 108. Output terminal 140 is connected to panel meter 24. A trigger and a blanking signal generated by control 110 are applied selectively to panel meter 24 for control thereof.

Control 110 comprises a divider 143, for example a divide by N, which operates to control the output rate of panel meter 24. A signal generated by divider 143 is applied to an AND gate 144, for example a four input terminal AND gate. The remaining input terminals of AND gate 144 receive the signals generated by resetable delay flop 56, the signal at the zero terminal of flip-flop 106 and the signal at the $\overline{Q}$ terminal of echo gate 92 via an inverter 146, respectively. The signal at the output of AND gate 144 is applied to automatic gain control stretcher 40 and a trigger input 148 of panel meter 24 via a settling delay and trigger flip-flop 150. The signal generated by resetable delay flop 56 is fed to an AND gate 152 which also receives and the signal at the $\overline{Q}$ terminal of echo gate flip-flop 92 via an inverter 145. The signal generated by AND gate 152 is applied as a reset signal to divider 143 and as a set signal to a blanking latch 154. The signal at the output terminal of settling delay and trigger flip-flop 150 is applied also to blanking latch 154 as a reset signal. A signal at the output of blanking latch 154 is applied to a blanking terminal 156 of panel meter 24 via a hold blanking select control switch 158. Panel meter 24 is triggered by a trigger signal applied to terminal 148. The display of panel meter 24 is disabled by a blanking signal applied to terminal 156.

In the exemplary discussion of ultrasonic-gaging system 10 operation which follows, the phase 1 and phase 2 portions of a measurement cycle are referred to as a dummy measurement and a full measurement. In the dummy measurement portion, offset capacitor 138 is charged to a voltage which is dependent upon a current related to the material velocity coefficient of object 12, the offset voltage of amplifier 118, the artifice pulse and system errors including the turn-on and turn off transients of switch 122, the delays of interval flip-flop 90, echo gate flip-flop 92 and integrator control flip-flop 98, the storage turn-off/turn-on effects on diode 120 and the time delays of pulse forming network 100. At the end of the full measurement portion, an analog voltage which is independent of the offset voltage of amplifier 118, system errors and the artifice pulse is applied to panel meter 24.

MODE 1 OPERATION

A. Mode 1 Dummy Measurement

The dummy measurement portion of the mode 1 measurement cycle is initiated by energizing oscillator 54. An output signal generated by oscillator 54 sets resetable delay flop 56 and triggers flip-flop 106. An output signal generated by resetable delay flop 56 and applied to inverter 112 is high and the signal at the output terminal of inverter 112 is low. In consequence, switch 136 is de-energized or in the opened state. The signal at the output terminal of inverter 112 is applied to one input terminal of AND gate 108 and a high signal as at the one terminal of flip-flop 106 is applied to the other input terminal of AND gate 108. The signal at the output terminal of AND gate 108 is low and switch 142 is in the opened state. The leading edge of a differentiated signal generated by resetable delay flop 56 causes discharge integrator delay flop 60, for example a 50 microsecond delay flop, to generate an output signal which closes switch 128, whereby integrator capacitor 124 is discharged. The trailing edge of a differentiated signal generated by discharge integrator delay flop 60 sets trigger pulser flip-flop 58 and energizes zero delay flop 62 and blanking delay flop 64. Pulser 28 is gated on by trigger pulser flip-flop 58 and generates a driving pulse which is applied to transducer 14. Echo pulses sensed by transducer 14 are fed to amplifiers 44 and 50 via amplifiers 30 and 32. Search delay flop 70 is triggered by the trailing edge of a differentiated signal generated by blanking delay flop 64. The signal at the output terminal of search delay flop 70 is applied to one input terminal of AND gate 74 via OR gate 72. The other input terminal of AND gate 74 receives the high signal at the one terminal of flip-flop 106. The high signal at the terminal of AND gate 74 and a sensed echo pulse are applied to AND gate 46 which generates an enable automatic gain control acquisition signal. Automatic gain control stretcher 40 is enabled to allow the echoes coming through during the search interval to update the AGC level which is continuously applied to amplifiers 30 and 32 via automatic gain control distribution network 42.

The output signal generated by discharge integrator delay flop 60 also resets interval flip-flop 90, echo gate flip-flop 92 and integrator control flip-flop 98. The J/K terminals of interval flip-flop 90 and echo gate flip-flop 92 are made high and enabled by the mode 1 enable signal applied thereto via OR gate 93. The J terminal of interval flip-flop 90 is high and interval flip-flop 90 is capable of being set by a signal applied to its clock terminal. One input terminal of AND gate 94 receives a low signal as at the zero terminal of flip-flop 106. The signal at the output terminal of AND gate 94 is low and the signal at the output terminal of inverter 96, which is applied to the J terminal of echo gate flip-flop 92, is high. Echo gate flip-flop 92 is capable of being set by a signal applied to its clock terminal. As previously indicated, the trailing edge of the differentiated pulse generated by discharge integrator delay flop 60 is applied to zero delay flop 62. The trailing edge of the signal generated by zero delay flop 62 is applied to the clock input terminals of interval flip-flop 90 and echo gate flip-flop 92. Interval flip-flop 90 and echo gate flip-flop 92 are set.

The leading edge of a differentiated signal applied to the set terminal of integrator control flip-flop 98 via coupling network 104 sets integrator control flip-flop 98. The signal generated from the $\overline{Q}$ terminal of integrator control flip-flop 98 de-energizes shunt switch 122 to the opened state. At this time, switch 128 is already de-energized and in the opened state. Integrator 124 is charged by a current related to the material velocity coefficient of object 12 which is generated by material velocity coefficient control 116. A pulse formed in pulse forming network 99 from the trailing edge of the signal generated from the $\overline{Q}$ terminal of echo gate flip-flop 92 is applied to the clock terminal of integrator control flip-flop 98. The trailing edge of this pulse resets integrator control flip-flop 98. Shunt switch 122 is energized into the closed state and the charging of integrator capacitor 124 ceases. At the end of the dummy measurement, e.g., measurement of the pulse generated by pulse forming network 99, resetable delay flop 56 is reset by the end of the search delay via the signal at the output terminal of OR gate 72. Trigger pulser 58 is reset by the trailing edge of the delay flip 56 signal. Series switch 136 and clamp switch 142 are closed and offset capacitor 138 is charged by a current through amplifier 118 from integrator capacitor 124.

B. Mode 1 Full Measurement

The full measurement portion of the mode 1 measurement cycle is initialed by energizing oscillator 54. The pulse generated by oscillator 54 sets resetable delay flop 56 and triggers flip-flop 106. The gated signal generated by resetable delay flop 56 and applied to the input terminal of inverter 112 is high. In consequence, switch 136 is de-energized or in the opened state. The signal at the output terminal of AND gate 108 is low and switch 142 is in the opened state. The leading edge of the differentiated signal generated by resetable delay flop 56 causes discharge integrator delay flop 60 to generate an output signal which closes switch 128, whereby integrator capacitor 124 is discharged. The trailing edge of the differentiated signal generated by discharge integrator 60 sets trigger pulser flip-flop 58 and energizes zero delay flop 62 and blanking delay flop 64. Pulser 28 is gated on by trigger pulser flip-flop 58 and generates a driving pulse which is applied to transducer 14. Echo pulses sensed by transducer 14 are fed to amplifiers 44 and 50 via amplifiers 30 and 32. Search delay flop 70 is enabled by the trailing edge of the differentiated signal generated by blanking delay flop 64. Flip-flop 106 is triggered by the pulse generated by oscillator 54 and changes state. Since the signal at the one terminal of flip-flop 106 is low, automatic gaincontrol stretcher 40 is not enabled and coasts at the AGC level established during the dummy measurement.

The signal at the output terminal of delay flop 60 also resets interval flip-flop 90, echo gate flip-flop 92 and integrator control flip-flop 98. The J/K terminals of interval flip-flop 90 and echo gate flip-flop 92 are made true by the mode 1 enable signal applied thereto via OR gate 93. The J terminal of interval flip-flop 90 is high and interval flip-flop 90 is capable of being set by a signal applied to its clock terminal. The high signal at the $\overline{Q}$ terminal of interval flip-flop 90 and the high signal at the zero terminal of flip-flop 106 are applied to their respective input terminals of AND gate 94. The signal at the output terminal of AND gate 94 is high and the signal at the output terminal of inverter 96 is low. Since the signal at the J terminal of echo gate flip-flop is low, echo gate flip-flop is not capable of being set by pulses applied to its clock terminal. As previously indicated, the trailing edge of the differentiated signal generated by discharge integrator delay flop 60 is applied to zero delay flop 62. The trailing edge of the signal generated by zero delay flop 62 is applied to the clock input terminals of interval flip-flop 90 and echo gate flip-flop 92. Interval flip-flop 90 is set and echo gate flip-flop 92 is not set. The differentiated signal applied to the set terminal of integrator control flip-flop 98 via coupling network 104 sets integrator control flip-flop 98. The signal generated from the $\overline{Q}$ terminal of integrator control flip-flop 98 opens shunt switch 122. At this time switch 128 is in the opened state. Integrator capacitor 124 is charged by a current related to the material velocity coefficient of object 12 which is generated by material velocity coefficient control 116. It is to be noted that, after interval flip-flop 90 is set, the signal at its $\overline{Q}$ terminal goes low. In consequence, the signal at the J terminal of echo gate flip-flop 92 goes high and echo gate flip-flop is capable of being set by a signal applied to its clock terminal. The signal generated by search delay flop 70 enables AND gate 52 via OR gate 72 and 76. An echo pulse as at the output of amplifier 40 is applied to the clock terminal of echo gate flip-flop 92. The artifice pulse initiated by the trailing edge of the signal at the $\overline{Q}$ terminal of echo gate flip-flop 92 and formed by pulse forming network 99 is applied to the clock terminal of integrator control flip-flop 98. The trailing edge of this pulse operates to reset integrator control flip-flop 98. Shunt switch 122 is de-energized to the closed state and charging of integrator capacitor 124 stops. It will be realized that during the full measurement cycle, integrator capacitor 124 is charged by the material velocity coefficient current for the time interval between the trailing edge of the zero delay flop 62 signal and the trailing edge of the first echo pulse received after the time period defined by blanking delay flop 64 plus the artifice pulse formed by pulse forming network 99.

At the end of the full measurement, resetable delay flop 56 is reset by the signal at the output terminal of OR gate 72, which causes trigger pulser 58 to be reset. Series switch 136 is closed and output clamp switch 142 is opened. The voltage from amplifier 118 from integrator capacitor 124 is fed to panel meter 24 via offset capacitor 138. Since the voltage across offset capacitor 138 during the dummy measurement included the offset error of amplifier 118, the measurement of the artifice pulse including system errors such as turn-on/turn-off transients of switch 122, storage effects in diode 120 and delays in interval flip-flop 90, echo gate flip-flop 92 and integrator control flip-flop 98, the analog signal applied to panel meter 24 is free of these errors. If echo gate flip-flop 92 is not set during the full measurement cycle, an incomplete measurement, the signal at the $\overline{Q}$ terminal thereof is high, whereby the signal at the output terminal of AND gate 152 is high. Blanking latch 154 is set and a blanking signal is applied to terminal 156 of panel meter 24 via closed switch 158. Panel meter 24 is blanked. If echo gate flip-flop 92 is set during the full measurement cycle, a complete measurement, the signal at the $\overline{Q}$ terminal thereof is low and the signal applied to one terminal of four input terminal AND gate 144 via inverter 146 is high. The last state generated by divider 143 enables settling delay and trigger flip-flop 150. In consequence, a trigger is applied to terminal 148 and panel meter 24 is triggered to begin conversion of the absolute analog signal as at terminal 140. The thickness of object 12 is presented in digital form by panel meter 24.

MODE 2 OPERATION

A. Mode 2 Dummy Measurement

The dummy measurement portion of the mode 2 measurement cycle is initiated by energizing oscillator 54. An output signal generated by oscillator 54 sets resetable delay flop 56 and triggers flip-flop 106. An output signal generated by resetable delay flop 56 and applied to inverter 112 is high and the signal at the output terminal of inverter 112 is low. In consequence, switch 126 is de-energized or in the opened state. The signal at the output terminal of inverter 112 is applied to one input terminal of AND gate 108 and a high signal at the one terminal of flip-flop 106 is applied to the other input terminal of AND gate 108. The signal at the output terminal of AND gate 108 is low and switch 142 is in the opened state. The leading edge of a differentiated signal generated by resetable delay flop 56 causes discharge integrator delay flop 60 to generate an output signal which closes switch 128, whereby integrator capacitor 124 is discharged. The trailing edge of a differentiated signal generated by discharge integrator delay flop 60 sets trigger pulser flip-flop 58 and energizes blanking delay flop 64. Pulser 28 is gated on by trigger pulser flip-flop 58 and a generate driving pulses which is applied to transducer 14. Echo pulses sensed by transducer 14 are fed to amplifiers 44 and 50 via amplifiers 30 and 32. Search delay flop 70 is triggered by the trailing edge of a differentiated signal generated by blanking delay flop 64. The signal at the output terminal of search delay flop 70 is applied to one input terminal of AND gate 74 via OR gate 72. The other input terminal of AND gate 74 receives the high signal at the one terminal of flip-flop 106. The high signal at the output terminal of AND gate 74 and a sensed echo pulse are applied to AND gate 46 which generates an enable automatic gain control acquisition signal. Automatic gain control stretcher 40 is enabled to allow the echoes coming through during the search interval to update the AGC level which is continuously applied to amplifiers 30 and 32 via automatic gain control distribution network 42.

The output signal generated by discharge integrator delay flop 60 also resets interval flip-flop 90, echo gate flip-flop 92 and integrator control flip-flop 98. The J/K terminals of interval flip-flop 90 and echi gate flip-flop 92 are made high by an enable signal generated by search delay flop 70 and applied thereto via OR gate 93. The J terminal of interval flip-flop 90 is high and interval flip-flop 90 is capable of being set by a signal applied to its clock terminal. One input terminal of AND gate 94 is low and the signal at the output terminal of inverter 96, which is applied to the J terminal of echo gate flip-flop 92, is high. Echo gate flip-flop 92 is capable of being set by a signal applied to its clock terminal. AND gate 52 is enabled by the signal generated by search delay flop 70 which is applied thereto via OR gates 72 and 76.

The trailing edge of an echo pulse as at the output terminal of amplifier 50 is applied to the clock input terminals of interval flip-flop 90 and echo gate flip-flop 92 via AND gate 52 and OR gate 68. Interval flip-flop 90 and echo gate flip-flop 92 are set. The leading edge of a differentiated signal applied to the set terminal of integrator control flip-flop 98 via coupling network 104 sets integrator control flip-flop 98. The signal generated from the $\overline{Q}$ terminal of integrator control flip-flop 98 de-energizes shunt switch 122 to the opened state. At this time, switch 128 is de-energized and in the opened state. Integrator capacitor 124 is charged by a current related to the material velocity coefficient of object 12 which is generated by material velocity coefficient control 116. A pulse formed in pulse forming network 99 from the trailing edge of the signal generated from the $\overline{Q}$ terminal of echo gate flip-flop 92 is applied to the clock terminal of integrator control flip-flop 98. The trailing edge of this pulse resets integrator control flip-flop 98. Shunt switch 122 is energized into the closed state and the charging of integrator capacitor 124 ceases. At the end of the dummy measurement, i.e., measurement of the pulse generated by pulse forming network 99, resetable delay flop 56 is reset by the end of the search delay via signal at the output terminal of OR gate 72. Trigger pulser 58 is reset by the trailing edge of the delay flop 56 signal. Series switch 136 and clamp switch 142 are closed and offset capacitor 138 is charged by a current through amplifier 118 from integrator capacitor 124.

B. Mode 2 Full Measurement

The full measurement portion of the mode 2 measurement cycle is initialed by energizing oscillator 54. The pulse generated by oscillator 54 sets resetable delay flop 56 and triggers flip-flop 106. The gated signal generated by resetable delay flop 56 and applied to the input terminal of inverter 112 is high. In consequence, switch 136 is de-energized or in the opened state. The signal at the output terminal of AND gate 108 is low and switch 142 is in the opened state. The leading edge of the differentiated signal generated by resetable delay flop 56 causes discharge integrator delay flop 60 to generate an output signal which closes switch 128, whereby integrator capacitor 124 is discharged. The trailing edge of the differentiated signal generated by discharge integrator 60 sets trigger pulser flip-flop 58 and energizes blanking delay flop 64. Pulser 28 is gated on by trigger pulser flip-flop 58 and generates a driving pulse which is applied to transducer 14. Echo pulses sensed by transducer 14 are fed to amplifiers 44 and 50 via amplifiers 30 and 32. Search delay flop 70 is enabled by the trailing edge of the differentiated signal generated by blanking delay flop 64. Since the signal at the one terminal of flip-flop 106 is low, automatic gain control stretcher 40 is not enabled and coasts at the AGC level established during the dummy measurement.

The signal at the output terminal of delay flop 60 also resets interval flip-flop 90, echo gate flip-flop 92 and integrator control flip-flop 98. The J/K terminals of interval flip-flop 90 and echo gate flip-flop 92 are made true by the enable signal generated by search delay flop 70 and applied thereto via OR gate 93. The J terminal of interval flip-flop 90 is high an interval flip-flop 90 is capable of being set by a signal applied to its clock terminal. The high signal at the $\overline{Q}$ terminal of interval flip-flop 90 and the high signal at the zero terminal of flip-flop 106 are applied to their respective input terminals of AND gate 94. The signal at the output terminal of AND gate 94 is high and the signal at the output terminal of inverter 96 is low. Since the signal at the J terminal of echo gate flip-flop 92 is low, echo gate flip-flop is not capable of being set by pulses applied to its clock terminal. AND gate 52 is enabled by the signal generated by search delay flop 70 which is applied thereto via OR gates 72 and 76. The trailing edge of an echo pulse as at the output terminal of amplifier 50 is applied to the clock input terminals of interval flip-flop 90 and echo gate flip-flop 92 via AND gate 52 and OR gate 68. Interval flip-flop 90 is set and echo gate flip-flop 92 is not set. The differentiated signal applied to the set terminal of integrator control flip-flop 98 via coupling network 104 sets integrator control flip-flop 98. The signal generated from the $\overline{Q}$ terminal of integrator control flip-flop 98 opens shunt switch 122. At this time switch 128 is in the opened state. Integrator capacitor 124 is charged by a current related to the material velocity coefficient of object 12 which is generated by material velocity coefficient control 116. It is to be noted that, after interval flip-flop 90 is set, the signal at its $\overline{Q}$ terminal goes low. In consequence, the signal at the J terminal of echo gate flip-flop 92 goes high and echo gate flip-flop is capable of being set by a signal applied to its clock terminal. The signal generated by search delay flop 70 enables AND gate 52 via OR gates 72 and 76. An echo pulse as at the output of amplifier 50 is applied to the clock terminal of echo gate flip-flop 90. The artifice pulse initiated by the trailing edge of the signal at the Q̄ terminal of echo gate flip-flop 92 and formed by pulse forming network 99 is applied to the clock terminal of integrator control flip-flop 98. The trailing edge of this pulse operates to reset integrator control flip-flop 98. Shunt switch 122 is de-energized to the closed state and charging of integrator capacitor 124 stops. It will be realized that during the full measurement cycle, integrator capacitor 124 is charged by the material velocity coefficient current for the time interval between the trailing edges of two successive echo pulses which are received after the time period defined by blanking delay flop 64 plus the artifice pulse formed by pulse forming network 99.

At the end of the full measurement, resetable delay flop 56 is reset by the signal at the output terminal of OR gate 72. Series switch 136 is closed and output clamp switch 142 is opened. The current through amplifier 118 from integrator capacitor 124 is fed to digital panel meter 24 via offset capacitor 138. Since the voltage across offset capacitor 138 during the dummy measurement included the offset error of amplifier 118, the measurement of the artifice pulse including system errors such as turn-on/turn-off transients of switch 122, storage effects in diode 120 and delays in interval flip-flop 90, echo gate flip-flop 92 and integrator control flip-flop 98, the analog signal applied to panel meter 24 is free of these errors. If echo gate flip-flop 92 is not set during the full measurement cycle, an incomplete measurement, the signal at the Q̄ terminal thereof is high. In consequence, the signal at the output terminal of AND gate 152 is high. Blanking latch 154 is set and a blanking signal is applied to terminal 156 of panel meter 24 via closed switch 158. Panel meter 24 is blanked. If echo gate flip-flop 92 is set during the full measurement cycle, a complete measurement, the signal at the Q̄ terminal thereof is low and the signal applied to one terminal of four input terminal AND gate 144 via inverter 146 is high. The last state generated by divider 143 enables settling delay and trigger flip-flop 150. In consequence, a trigger is applied to terminal 148 and panel meter 24 is triggered. The absolute analog signal as at terminal 140 is processed in panel meter 24 and the thickness of object 12 is presented in digital form.

MODE 3 OPERATION

A. Mode 3 Dummy Measurement

The dummy measurement portion of the mode 3 measurement cycle is initiated by energizing oscillator 54. An output signal generated by oscillator 54 sets resetable delay flop 56 and triggers flip-flop 106. An output signal generated by resetable delay flop 56 and applied to inverter 112 is high and the signal at the output terminal of inverter 112 is low. In consequence, switch 136 is de-energized or in the opened state. The signal at the output terminal of inverter 112 is applied to one input terminal of AND gate 108 and a high signal as at the one terminal of flip-flop 106 is applied to the other input terminal of AND gate 108. The signal at the output terminal of AND gate 108 is low and switch 142 is in the opened state. The leading edge of a differentiated signal generated by resetable delay flop 56 causes discharge integrator delay flop 60 to generate an output signal which closes switch 128, whereby integrator capacitor 124 is discharged. The output signal generated by discharge integrator delay flop 60 resets interval flip-flop 90, echo gate flip-flop 92 and integrator control flip-flop 98. The J terminal of interval flip-flop 90 is high. Ine input terminal of AND gate 94 receives a low signal as at the zero terminal of flip-flop 106. The signal at the output terminal of AND gate 94 is low and the signal at the output terminal of inverter 96, which is applied to the J terminal of echo gate flip-flop 92, is high.

The trailing edge of a differentiated signal generated by discharge integrator delay flop 60 sets trigger pulser flip-flop 58 and triggers interface echo delay flop 66. Pulser 28 is gated on by trigger pulser flip-flop 58 and generates a driving pulse qhich is applied to transducer 14. Echo pulses sensed by transducer 14 are fed to amplifiers 44 and 50 via amplifiers 30 and 32. Interface echo detect latch 80 is reset by an output signal generated by discharge integrator delay flop 60 and is disabled by the output signal generated by interface echo delay flop 66, for example a four microsecond gate. At the end of the four microsecond delay, the signal at the output terminal of interface echo delay flop 66 is high. The signal at the output terminal of AND gate 78 is high and AND gate 52 is enabled via OR gate 76. An echo pulse at the output terminal of AND gate 52, the interface echo pulse, sets interface echo detect latch 80. The leading edge of a differentiated signal generated by interface echo detect latch 80 triggers blanking delay flop 86 which is enabled in mode 3 only. The trailing edge of a differentiated signal generated by blanking delay flop 86 enables search delay flop 88. The high signal at the output terminal of search delay flop 88 is applied to the J/K terminals of interval flip-flop 90 and echo gate flip-flop 92 via OR gates 72 and 93. Interval flip-flop 90 and echo gate flip-flop are capable of being set by a signal applied to their clock terminals.

The signal at the output terminal of search delay flop 88 is applied also to one input terminal of AND gate 74 via OR gate 72. The other input terminal of AND gate 74 receives the high signal at the one terminal of flip-flop 106. The high signal at the output terminal of AND gate 74 and a sensed echo pulse are applied to AND gate 46 which generates an enable automatic gain control acquisition signal. Automatic gain control stretcher 40 is enabled to allow the echoes coming through during the search interval to update the AGC level which is continuously applied amplifiers 30 and 32 via automatic gain control distribution network 42. As previously indicated, AND gate 52 is enabled by the signal at the output terminal of AND gate 78. The trailing edge of an echo pulse as at the output terminal of amplifier 50 is applied to the clock input terminals of interval flip-flop 90 and echo gate flip-flop 92 via AND gate 52 and OR gate 68. Interval flip-flop 90 and echo gate flip-flop 92 are set. The leading edge of a differentiated signal applied to the set terminal of integrator control flip-flop 98 via coupling network 104 sets integrator control flip-flop 98. The signal generated from the Q̄ terminal of integrator control flip-flop 98 de-energizes shunt switch 122 to the opened state. At this time, switch 128 is de-energized and in the opened state. Integrator capacitor 124 is charged by a current related to the material velocity coefficient of object 12 which is generated by material velocity coefficient control 116. A pulse formed in pulse forming network 99 from the trailing edge of the signal generated from the $\bar{Q}$ terminal of echo gate flip-flop 92 is applied to the clock terminal of integrator control flip-flop 98. The trailing edge of this pulse resets integrator control flip-flop 98. Shunt switch 122 is energized into the closed state and the charging of integrator capacitor 124 ceases. At the end of the dummy measurement, i.e., measurement of the pulse generated by pulse forming network 99, resetable delay flop 56 is reset by the end of the search delay via the signal at the output terminal of OR gate 72. Trigger pulser 58 is reset by the trailing edge of the delay flop 56 signal. Series switch 136 and clamp switch 142 are closed and offset capacitor 138 is charged by a current through amplifier 118 from integrator capacitor 124.

B. Mode 3 Full Measurement

The full measurement portion of the mode 3 measurement cycle is initialed by energizing oscillator 54. The pulse generated by oscillator 54 sets resetable delay flop 56 and triggers flip-flop 106. The gated signal generated by resetable delay flop 56 and applied to the input terminal of inverter 112 is high. In consequence, switch 136 is de-energized or in the opened state. The signal at the output terminal of AND gate 108 is low and switch 142 is in the opened state. The leading edge of the differentiated signal generated by resetable delay flop 56 causes discharge integrator delay flop 60 to generate an output signal which closes switch 128, whereby integrator capacitor 124 is discharged. The trailing edge of the differentiated signal generated by discharge integrator 60 sets trigger pulser flip-flop 58 and triggers interface echo delay flop 66. Pulser 28 is gated on by trigger pulser flip-flop 58 and generates a driving pulse which is applied to transducer 14. Echo pulses sensed by transducer 14 are fed to amplifiers 44 and 50 via amplifiers 30 and 32. Search delay flop 70 is enabled by the trailing edge of the differentiated signal generated by blanking delay flop 64. Since the signal at the one terminal of flip-flop 106 is low, automatic gain control stretcher 40 is not enabled and coasts at the AGC level established during the dummy measurement. The signal at the output terminal of delay flop 60 resets interval flip-flop 90, echo gate flip-flop 92 and integrator control flip-flop 98. The J terminal of interval flip-flop 90 is high. The high signal at the $\bar{Q}$ terminal of interval flip-flop 90 and the high signal at the zero terminal of flip-flop 106 are applied to their respective input terminals of AND gate 94 is high and the signal at the output terminal of inverter 96 is low.

Interface echo detect latch 80 is reset by the output signal generated by interface echo delay flop 66. At the end of the four microsecond delay, the signal at the output terminal of interface echo delay flop 66 is high. The signal at the output terminal of AND gate 78 is high and AND gate 52 is enabled via OR gate 76. An echo pulse as at the output terminal of AND gate 52 sets interface echo detect latch 80. The leading edge of the differentiated signal generated by interface echo detect latch 80 triggers blanking delay flop 86. The trailing edge of a differentiated signal generated by blanking delay flop 86 enables search delay flop 88. The high signal at the output terminal of search delay flop 88 is applied to the J/K terminals of interval flip-flop 90 and echo gate flip-flop 92 via OR gates 72 and 93. Since the J and J/K terminals of interval flip-flop 90 are true, interval flip-flop 90 is capable of being set by a signal applied to its clock terminal. Since the J terminal of echo gate flip-flop 92 is low, echo gate flip-flop 92 is not capable of being set by a signal applied to its clock terminal.

As previously indicated, AND gate 52 is enabled by the signal at the output terminal of AND gate 78. The trailing edge of an echo pulse as at the output terminal of amplifier 50 is applied to the clock input terminals of interval flip-flop 90 and echo gate flip-flop 92. Interval flip-flop 90 is set and echo gate flip-flop 92 is not set. The leading edge of the differentiated signal applied to the set terminal of integrator control flip-flop 98 via coupling network 104 sets integrator control flip-flop 98. The signal generated from the $\bar{Q}$ terminal of integrator control flip-flop 98 opens shunt switch 122. At this time switch 128 is in the opened state. Integrator capacitor 124 is charged by a current related to the material velocity coefficient of object 12 which is generated by material velocity coefficient control 116. It is to be noted that, after interval flip-flop 90 is set, the signal at its $\bar{Q}$ terminal goes low. In consequence, the signal at the J terminal of echo gate flip-flop 92 goes high and echo gate flip-flop is capable of being set by a signal applied to its clock terminal. The signal generated by search delay flop 88 enables AND gate 52 via OR gate 72 and 76. An echo pulse as at the output of amplifier 50 is applied to the clock terminal of echo gate flip-flop 90. The artifice pulse initiated by the trailing edge of the signal at the $\bar{Q}$ terminal of echo gate flip-flop 92 and formed by pulse forming network 99 is applied to the clock terminal of integrator control flip-flop 98. The trailing edge of this pulse operates to reset integrator control flip-flop 98. Shunt switch 122 is de-energized to the closed state and charging of integrator capacitor 124 stops. It will be realized that during the full measurement cycle, integrator capacitor 124 is charged by the material velocity coefficient current for the time interval between the trailing edges of two successive echo pulse received after the time period defined by interface echo delay flop 66, blanking delay flop 86 and the artifice pulse formed by pulse forming network 99.

At the end of the full measurement, resetable delay flop 56 is reset by the signal at the output terminal of OR gate 72. Series switch 136 is closed and output clamp switch 142 is opened. The current through amplifier 118 from integrator capacitor 124 is fed to panel meter 24 via offset capacitor 138. Since the charge on offset capacitor 138 during the dummy measurement included the offset error of amplifier 118, the measurement of the artifice pulse including system errors such as turn-on/turn-off transients of switch 122, storage effects in diode 120 and delays in interval flip-flop 90, echo gate flip-flop 92 and integrator control flip-flop 98, the analog signal applied to panel meter 24 is free of these errors. If echo gate flip-flop 92 is not set during the full measurement cycle, an incomplete measurement, the signal at the $\bar{Q}$ terminal thereof is high. In consequence, the signal at the output terminal of AND gate 152 is high. Blanking latch 154 is set and a blanking signal is applied to terminal 156 of panel meter 24 via closed switch 158. Panel meter 24 is blanked. If echo gate flip-flop 92 is set during the full measurement cycle, a complete measurement, the signal at the $\bar{Q}$ terminal thereof is low and the signal applied to one terminal of four input terminal AND gate 144 via inverter 146 is high. The last state generated by divider 143 enables settling delay and trigger flip-flop 150. In consequence, a trigger is applied to terminal 148 and digital panel meter 24 is enabled. The absolute analog signal as at terminal 140 is processed in panel meter 24 and the thickness of object 12 is presented in digital form.

Figure 4:
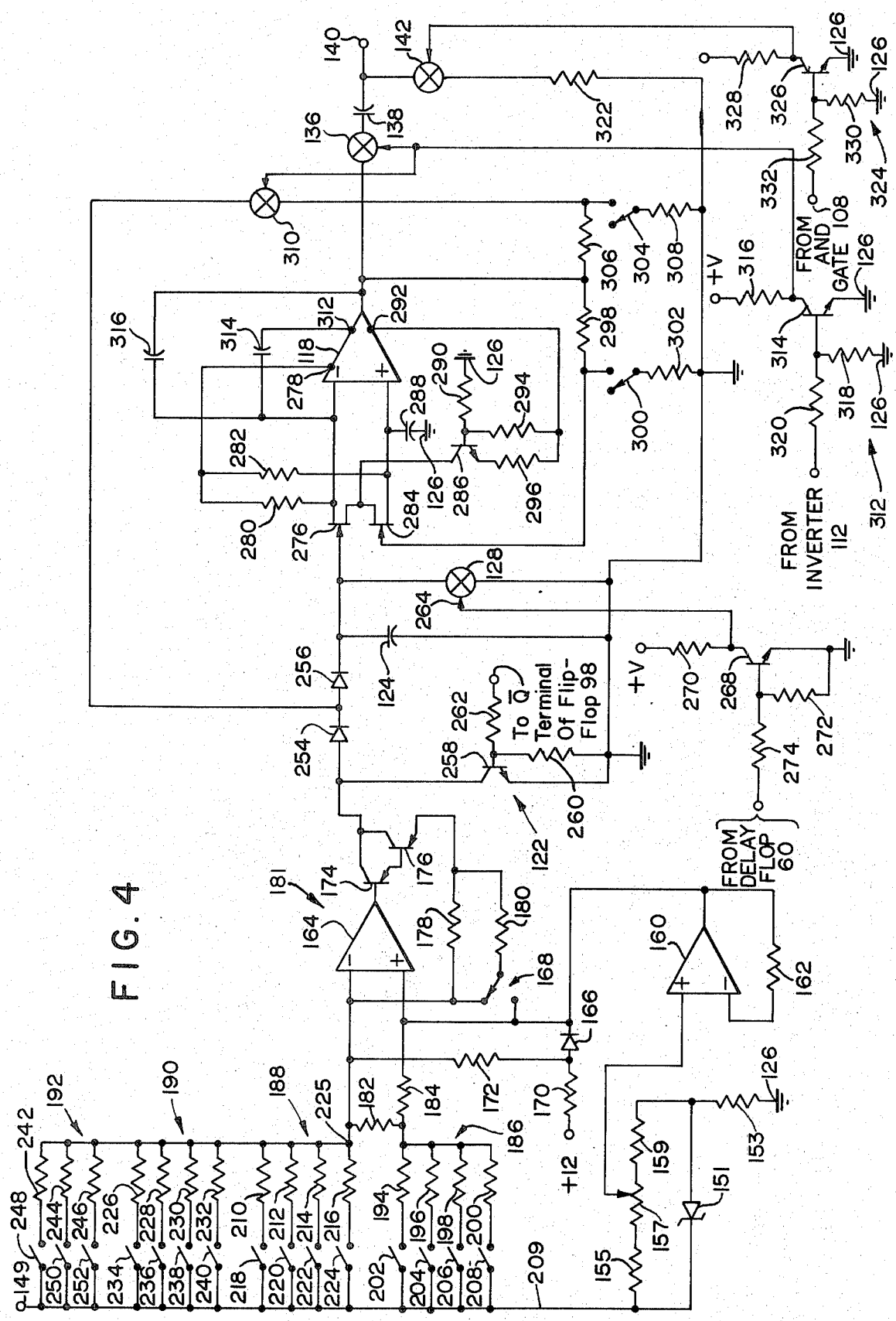
FIG. 4 is a detailed schematic diagram of the conversion unit of FIG. 3.

Referring now to FIG. 4, it will be seen that reference source 114 comprises a temperature compensated zener diode 151 which is referenced to a voltage for example, positive twelve volts, as at terminal 149. A fixed resistor 155, a variable resistor 157 and a fixed resistor 159, which define a voltage divider network, are serially connected between the cathode and anode of diode 151. A resistor 153 is connected between diode 151 and return 126. The wiper arm of resistor 157 is connected to the non-inverting input terminal of an amplifier 160 having a feedback resistor 162 connected between its output and inverting input terminals. The output terminal of amplifier 160 is connected to the non-inverting input terminal of an amplifier 164. The output terminal of amplifier 160 is also connected to the cathode of a diode 166 and one terminal of a gain control switch 168. The anode of diode 166 is connected to the junction of resistors 170 and 172. The other side of resistor 170 is connected to a voltage, for example positive 12 volts, and the other side of resistor 172 is connected to the inverting input terminal of amplifier 164, for providing a temperature compensated current for balancing the amplifier bias current. The output terminal of amplifier 164 is connected to the base of a transistor 174, the emitter of which is connected to the base of a transistor 176. The emitter of transistor 176 is connected to the junction of one side of resistors 178 and 180. Amplifier 164 and transistors 174 and 176 define a current source 181. The other side of resistor 180 is connected to a contact arm of switch 168 and the other side of resistor 178 is connected to the junction of a contact of switch 168 and the inverting input terminal of amplifier 164. A resistor 184 is connected in series between the non-inverting terminal of amplifier 164 and one side of a resistor 182, the other side of resistor 182 being connected to the inverting terminal of amplifier 164. The signals generated by material velocity control 116 are applied to amplifier 164.

Material velocity coefficient control 116 is a programmable digital to analog resistive ladder network comprising a units state 186, a tens stage 188, a hundreds state 190 and a thousands stage 192. Units stage 186 includes resistors 194, 196, 198 and 200 and switches 202, 204, 206 and 208. One side of resistors 194, 196, 198, and 200 is connected to the non-inverting terminals of amplifier 164 through resistor 184. The other side of resistors 194, 196, 198 and 200 is connected to a contact of switches 202, 204, 206 and 208, respectively. A contact arm of switches 202, 204, 206 and 208 is connected to a common line 209 which is further connected to the junction of resistor 155 and the cathode of diode 151. A voltage for example a positive 12 volts, is applied to common line 209. Resistors 194, 196, 198 and 200 are weighted and represent the eight, four, two and one bits of a binary coded decimal code. Tens stage 188 includes resistors 210, 212, 214 and 216 and switches 218, 220, 222 and 224. One side of resistors 210, 212, 214 and 216 is connected to a junction 225 which is further connected to the inverting input terminal of amplifier 164. The other side of resistors 210, 212, 214 and 216 is connected to a contact of switches 218, 220, 222, and 224, respectively. A contact arm of switches 218, 220, 222, and 224 is connected to common line 209. Resistors 210, 212, 214 and 216 are weighted and represent the eight, four, two and one bits of a binary coded decimal code. The hundreds stage 190 includes resistors 226, 228, 230 and 232 and switches 234, 236, 238 and 240. One side of resistors 226, 228, 230 and 234 is connected to junction 225. The other side of resistors 226, 228, 230 and 232 is connected to a contact of switches 234, 236, 238 and 240, respectively. A contact arm of switches 234, 236, 238 and 240 is connected to common line 209. Resistors 226, 228, 230 and 232 are weighted and represent the eight, four, two and one bits of binary coded decimal code. The thousands stage 192 includes resistors 242, 244 and 246 and switches 248, 250 and 252. One side of resistors 242, 244 and 246 is connected to junction 225. The other side of resistors 242, 244 and 246 is connected to a contact of switches 248, 250 and 252, respectively. A contact arm of switches 248, 250 and 252 is connected to common line 209.

In the illustrated embodiment, by way of example, the switches in material velocity coefficient control 116 are decade thumb wheel switches. A current which is proportional to the material velocity coefficient of object 12 is applied to amplifier 164 by selectively setting the thumb wheel switches to a value specified by the material velocity coefficient of object 12. The gain of amplifier 164 is controlled by switch 168. The signal at the output terminal of current source 181 is applied to integrator capacitor 124 via diodes 254 and 256. The cathode of diode 254 is connected to the anode of diode 256 and the cathode of diode 256 is connected to one side of capacitor 124. The anode of diode 254 is connected to the collector of a transistor 258. The emitter contact of transistor 258 is connected to return 126 and the base contact of transistor 258 is connected to return 126 through a resistor 260. The signal of the $\overline{Q}$ terminal of integrator control flip-flop 98 applied to the base of transistor 258 through a resistor 262. The signal generated by discharge integrator delay flop 60 is applied to a control terminal 264 of switch 128 via a driver 266. Driver 266 includes a transistor 268 and resistors 270, 272 and 274. A positive voltage is applied to the collector contact of transistor 268 through resistor 270 and the emitter contact of transistor 268 is connected to return 126. Resistor 272 is connected between the base and emitter contacts of transistor 268. The signal generated by discharge integrator delay flop 60 is applied to the base contact of transistor 268 through resistor 274. The signal stored on integrator capacitor 124 is coupled to amplifier 118 via a field effect transistor 276 which provided a high impedance front end. The gate of field effect transistor 276 is connected to the junction of capacitor 124 and switch 128. The drain of field effect transistor 276 is connected to a terminal 278 of amplifier 118 via a resistor 280. A resistor 282 is connected between terminal 278 and the drain of a field effect transistor 284. The sources of field effect transistors 276 and 284 are connected to the collector contact of a transistor 286 as a bias current source. The junction of resistor 282 and the drain effect of field transistor 278 are connected to the non-inverting input terminal of amplifier 118 which is further connected to the non-inverting input terminal of amplifier 118 which is further connected to return 126 through a capacitor 288. The base contact of transistor 286 is connected to return 126 through a resistor 290 and to a terminal 292 of amplifier 118 through a resistor 294. The emitter contact of transistor 286 is connected to terminal 292 through a resistor 296. Transistor 286 operates to supply current for biasing of field effect transistors 276 and 284. The gate of field effect transistor 284 is connected to the output terminal of amplifier 118 through a resistor 298. The gate of field effect transistor 284 is also connected to return 126 through a gain switch 300 and a resistor 302. The output terminal of amplifier 118 is connected to a contact of a switch 304 via a resistor 306. A contact arm of switch 304 is connected to return 126 via a resistor 308. The junction of resistor 306 and the contact of switch 304 is further connected to the junction of cathode of diode 254 and the anode of diode 256 through a switch 310. A terminal 312 of amplifier 118 is connected to the inverting input terminal of amplifier 118 through a capacitor 314. The inverting input terminal of amplifier 118 is connected to the output terminal thereof through a capacitor 316. The output terminal of amplifier 118 is further connected to offset capacitor 138 through switch 136. The switching states of switches 136 and 310 are controlled by a driver 312 which includes a transistor 314 and resistors 316, 318 and 320. The signal at the output terminal of inverter 112 is applied to the base contact of transistor 314 through resistor 320. The base contact of transistor 314 is further connected to return 126 through resistor 318. The emitter contact of transistor 314 is connected directly to return 126. A positive voltage is applied to the collector contact of transistor 314 through resistor 316. The control terminals of switches 136 and 310 are connected to the collector contact of transistor 314. Output terminal 140 is connected to return 126 through clamp switch 142 and a resistor 322. Clamp switch 142 is controlled by a driver 324 which includes a transistor 326 and resistors 328, 330 and 332. A signal at the output of AND gate 108 is fed to the base contact of transistor 326 through resistor 332. The base contact of transistor 326 is connected to return 126 through resistor 330 and the emitter of transistor 326 is connected directly to return 126. A positive voltage is applied to the collector contact of transistor 326 through resistor 328. The collector of transistor 326 is connected to the control terminal of switch 142.

In operation of conversion unit 22, the decade thumb wheel switches in material velocity control 116 are set to generate a current which is related to the material velocity coefficient of object 12. The material velocity coefficient current is fed to amplifier 164, the gain of which is controlled by the position of switch 168. The current source signal at the output terminal of current source 181 is fed to capacitor 124 via diodes 254 and 256 through switch 310 operates to guard against leakage of the diodes when transistor 258 is in a nonconducting state. The signal stored on integrator capacitor 124 is applied to amplifier 118 through field effect transistor 276 which presents a high input impedance. Field effect transistors 276 and 284 are biased by the current generated by transistor 286. A signal at the output of amplifier 118, the gain of which is controlled by the position of switches 300 and 304, is fed to capacitor 138 through switch 136. At the end of the measurement cycle, switch 142 is opened and the absolute analog signal is applied to digital panel meter 24 via terminal 140.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device adapted for interconnection with a transducer operatively connected to an object for generating an absolute analog signal related to the thickness of the object, the transducer transmits vibrations to the object, senses echoes generated by the object and generates echo pulses, said device comprising:
   a. pulser/receiver means adapted for interconnection with the transducer for generating driving pulses and for sensing echo pulses;
   b. digitally controlled means for generating a first signal defined by the material velocity coefficient of the object;
   c. processing means operatively connected to said pulser/receiver means and digitally controlled means, said processing means generating an absolute analog signal related to the material velocity coefficient and echo pulse delay through the object, said absolute analog signal defining the thickness of the object; and
   d. digital panel meter means operatively connected to said processing means for presenting said absolute analog signal in digital form;
   e. said processing means including
      i. first storage means operatively connected to said digitally controlled means for storing a voltage related to said first signal;
      ii. first switch means having first and second switching states, said first signal applied to said first storage means when said first switch means is in said first switching state;
      iii. amplifier means having at least one input terminal and an output terminal, second and third signals successively presented at said output terminal, said first storage means operatively connected to said input terminal;
      iv. second switch means having first and second switching states, said second switch means operatively connected to said output terminal;
      v. second storage means operatively connected to said second switch means for storing said second signal as at said output terminal; and
      vi. third switch means having first and second switching states, said third switch means operatively connected to said second storage means, said second signal at said output terminal stored on said second storage means when said second and third switch means are in said second switching state, a fourth signal applied to said digital panel meter means via said second storage means when said second switch means is in said second switching state and said third switch means is in said first switching state, said fourth signal being the difference between said second and third signals.

2. The device as claimed in claim 1 wherein said first storage means is an integrator capacitor and said second storage means is an offset capacitor.

3. A measuring system adapted for interconnection with a transducer operatively connected to an object for generating an absolute analog signal related to the thickness of the object, the transducer transmits vibration to the object, senses echoes generated by the object and generates echo pulses, said system comprising:
  a. pulser/receiver means adapted for interconnection with the transducer for generating driving pulses and for sensing echo pulses;
  b. digitally controlled means for generating a first signal defined by the material velocity coefficient of the object;
  c. processing means operatively connected to said pulser/receiver means and said digitally controlled means, said processing means including first storage means and second storage means, said first storage means charged to a first voltage for a first time interval related to said first signal, said first voltage applied to said second storage means and said first storage means discharged, said second storage means charged to a second voltage, said second voltage including said first voltage and errors inherent in the measuring system, said first storage means charged to a third voltage for a second time interval, said second time interval including said first time interval and a third time interval, said third time interval related to said sensed echo pulses and to the thickness of the object; and
  d. output means operatively connected to said second storage means, said third voltage applied to said second storage means, an absolute analog signal presented at said output means, said absolute analog signal being the difference between said third voltage and said second voltage, said absolute analog signal representing the thickness of the object.

4. The measuring system as claimed in claim 3 wherein said output means includes digital panel meter means operatively connected to said second storage means, said digital panel meter means operative to present said absolute analog signal in digital form.

5. The device as claimed in claim 3 wherein said digitally controlled means includes a programmable resistive divider ladder network for generating a current proportional to the material velocity coefficient of the object.

6. A device adapted for interconnection with a transducer operatively connected to an object for generating an absolute analog signal related to the thickness of the object, the transducer transmits vibrations to the object, senses echoes generated by the object and generates echo pulses, said device comprising:
  a. pulser/receiver means adapted for interconnection with the transducer for generating driving pulses and for sensing echo pulses;
  b. digitally controlled means for generating a first signal defined by the material velocity coefficient of the object; and
  c. processing means operatively connected to said pulser/receiver means and digitally controlled means, said processing means generating an absolute analog signal related to the material velocity coefficient and echo pulse delay through the object, said absolute analog signal defining the thickness of the object;
  d. said processing means including
    i. control means for generating control signals;
    ii. first flip-flop means having set and reset states, said first flip-flop means operatively connected to said control means;
    iii. second flip-flop means having set and reset states, said second flip-flop means operatively connected to said control means and said first flip-flop means; and
    iv. third flip-flop means operatively connected to said first and second flip-flop means, said third flip-flop means triggered to said set state by said first flip-flop means and triggered to said reset state by said second flip-flop means, said third flip-flop means selectively controlling said processing means.

7. The device as claimed in claim 6 including:
  a. differentiation coupling means operatively connected between said first and third flip-flop means; and
  b. pulse forming means operatively connected between said second and third flip-flop means.

8. A method of generating an absolute analog signal representing the time interval between two signals comprising the steps of:
  a. generating a first signal;
  b. applying said first signal to first storage means for a first time interval;
  c. storing a first voltage on said first storage means;
  d. applying a second signal related to said first voltage to second storage means;
  e. storing a second voltage related to said second signal on said second storage means;
  f. discharging said first storage means;
  g. generating a third signal;
  h. applying said third signal to said first storage means for a second time interval, said second time interval including said first time interval;
  i. storing a third voltage related to said third signal on said first storage means; and
  j. applying a fourth signal related to said third voltage to an output terminal via said second storage means, an absolute analog signal representing the difference between said first and second time intervals presented at said output terminal.

9. A method of measuring the thickness of an object having a material velocity coefficient comprising the steps of:
  a. generating a first signal related to the material velocity coefficient of the object;
  b. applying said first signal to a first capacitor for a first time interval and charging said first capacitor to a first voltage;
  c. applying said first voltage to a second capacitor and charging said second capacitor to a second voltage, said second voltage including measurement errors;
  d. generating a driving pulse for application to the object;
  e. sensing an echo pulse generated by the object, the time interval between said driving pulse and said echo pulse being related to the thickness of the object;
  f. generating a third signal related to the thickness of the object;
  g. applying said third signal to said first capacitor for a second time interval and charging said first capacitor to a third voltage, said second time interval including said first time interval, said second time interval determined by the thickness of the object and said first time interval; and h. applying said third voltage to an output terminal via said second capacitor, an absolute signal representing the difference between said second and third voltages presented at said output terminal.

10. The method of measuring the thickness of an object having a material coefficient as claimed in claim 9 including the step of digitally generating said first signal.

* * * * *